United States Patent [19]

Izumi et al.

[11] 4,350,669

[45] Sep. 21, 1982

[54] PROCESS FOR CONTROLLING NITROGEN OXIDES IN EXHAUST GASES

[75] Inventors: Jun Izumi; Nobuaki Murakami, both of Nagasaki, Japan

[73] Assignee: Mitsubishi Jukogyo Kabushiki Kaisha, Tokyo, Japan

[21] Appl. No.: 900,607

[22] Filed: Apr. 27, 1978

Related U.S. Application Data

[63] Continuation of Ser. No. 762,245, Jan. 25, 1977, abandoned.

[30] Foreign Application Priority Data

Jan. 30, 1976 [JP] Japan ................................. 51-8378

[51] Int. Cl.$^3$ ............................................. B01D 53/34
[52] U.S. Cl. .................................... 423/235; 423/400
[58] Field of Search ....................... 423/212, 235, 400

[56] References Cited

U.S. PATENT DOCUMENTS

| | | | |
|---|---|---|---|
| 3,867,507 | 2/1975 | Myerson | 423/235 X |
| 3,972,824 | 8/1976 | Fooladi | 423/235 X |
| 4,016,241 | 4/1977 | Nishikawa et al. | 423/239 |

FOREIGN PATENT DOCUMENTS 654427 12/1962 Canada .

*Primary Examiner*—G. O. Peters
*Attorney, Agent, or Firm*—Toren, McGeady & Stanger

[57] ABSTRACT

A process for controlling nitrogen oxides in combustion exhaust gases which comprises adding an oxygen-containing hydrocarbon and/or its precursor to exhaust gases and thereby oxidizing nitric oxide in the exhaust to nitrogen dioxide in the presence of oxygen.

3 Claims, 3 Drawing Figures

PROCESS FOR CONTROLLING NITROGEN OXIDES IN EXHAUST GASES

This is a continuation of application Ser. No. 762,245, filed on Jan. 25, 1977 now abandoned.

This invention relates to a process for absorbing nitrogen oxides (NOx) away from combustion waste gases, such as from boilers, with extremely high efficiencies and making the aqueous solution used for the absorption treatment harmless in an economical way.

Methods in use or under development for the removal of NOx from the exhaust gases leaving boilers and the like, which contain nitric oxide (NO) as the major ingredient and a small proportion of nitrogen dioxide ($NO_2$), are roughly divided into two, i.e., removal by (A) dry catalytic reduction and by (B) wet absorption. In either case, the low reactivity and low concentrations of NO (usually ranging from only tens to hundreds of parts per million) in the gases have presented difficulties in finding an economical process for NOx removal, which is now a subject of intense developmental efforts throughout the industry.

The dry catalytic reduction (A) is a process for allowing NOx to react with a reducing agent in the presence of a bed of a catalyst consisting of a metal or metallic compound and thereby selectively or nonselectively reducing the NOx to harmless $N_2$. In the case of selective reduction, ammonia or hydrogen sulfide is employed as the reducing agent and, in the case of nonselective reduction, hydrogen, methane, carbon monoxide or the like is used. Disadvantages of the process are the short catalyst life under the influence of sulfur dioxide ($SO_2$) in the exhaust gases and the difficulty of determining the catalyst life. In addition, the reducing agent recovered in the unreacted state must be treated to make it harmless. Another problem of practical importance to be solved yet is the release of untreated exhaust gases due to clogging of the catalyst bed with the dust from the gases.

The wet absorption (B) is generally carried out in three different ways. One of the methods uses an oxidizing aqueous solution to oxidize NO to nitric acid ions ($NO_3^-$) and have them absorbed in the solution (and is therefore called the liquid-phase oxidation-absorption method). Another method consists of oxidizing NO in a gaseous phase to $NO_2$ and $N_2O_5$ which can be more readily absorbed and then taking up the products into an absorbing solution of water and an alkali in the form of nitrates (the gaseous-phase oxidation-absorption method). A further modified method uses an aqueous solution of a reducing substance to reduce therein the $NO_2$ and $N_2O_5$ obtained in the manner described above to $N_2$ (the gaseous-phase oxidation liquid-phase reduction method).

In the liquid-phase oxidation absorption, a mixture of potassium permanganate and sodium hydroxide is most often employed as the absorbing solution. However, the solution is expensive and the treatment for recovery of the $NO_3^-$-containing used solution involves technical difficulties.

The gaseous-phase oxidation absorption is accomplished generally by either throughly oxidizing NO to $N_2O_5$ with ozone and then absorbing the resultant in water to recover the same in the form of nitric acid, or oxidizing NO to $NO_2$ and then absorbing the same in an aqueous solution of an alkali such as sodium sulfite to form nitric acid and an alkaline salt of nitrite.

The gaseous-phase oxidation liquid-phase reduction method typically comprises having $NO_2$ absorbed by a metal chelate of iron, nickel, copper with EDTA or the like, and then reducing the resultant to $N_2$ with a sulfite or the like.

Major economic and technical difficulties common to those methods of oxidizing NO to $NO_2$ in a gaseous phase and absorbing the latter in a liquid phase arise from the fact that no effective substances have thus far been found, except for ozone, as agents for oxidizing NO to $NO_2$.

The most economical of the processes for oxidation with ozone is by oxygen corona discharge. However, the process nevertheless necessitates a large power consumption and an ozoner which can account for as much as a half of the initial investment on a denitrifying plant. Thus ozone cannot be an optimum oxidizing agent for treating a large volume of effluent gases.

In the course of our experiments on oxidation of NO to $NO_2$ in a gaseous phase, we have found that oxygen is activated by the addition of an oxygen-containing hydrocarbon, such as methanol or formaldehyde, and becomes able to oxidize NO to $NO_2$ effectively. This is a behavior in the gaseous phase in striking contrast to the generally known intense reducibility of the methanol, formaldehyde, and other such oxygen-containing hydrocarbons in the liquid phase.

Taking advantage of this behavior, we have now developed a novel process for oxidizing NO to $NO_2$ without using the expensive ozone but by very inexpensive oxidizing means suited for the gaseous-phase oxidation absorption or for the gaseous-phase oxidation liquid-phase absorption procedure of the wet absorption technique.

The present invention thus resides, in essence, in a process for controlling NOx in combustion exhaust gases which comprises adding an oxygen-containing hydrocarbon and/or its precursor to exhaust gases and thereby oxidizing NO in the exhaust to $NO_2$ in the presence of oxygen.

For the purpose of the invention, the term "oxygen-containing hydrocarbons" as used herein indicates methanol, formaldehyde and the like, and their "precursors" are methane, ethane, propane, and other similar hydrocarbons.

The oxidation reaction in accordance with this invention is understood to consist of the following elementary reactions:

$$CH_3OH + O_2 \rightarrow HCHO + H_2O_2 \tag{1}$$

$$HCHO + O_2 \rightarrow HCOOH - O^* \tag{2}$$

$$HCOOH + O_2 \rightarrow H_2O_2 + CO_2 \tag{3}$$

$$H_2O_2 + NO \rightarrow NO_2 + H_2O \tag{4}$$

$$O^* + NO \rightarrow NO_2 \tag{5}$$

(*activated atoms)

It is presumed that, in the elementary reactions (1) through (5), $H_2O_2$ and $O^*$ are formed as intermediates, which then oxidize NO.

Since the oxidation reaction takes place where the oxygen-containing hydrocarbon, such as methanol or formaldehyde, and oxygen coexist, it is possible to use, as a precursor of oxygen-containing hydrocarbon in accordance with the invention, methane, ethane, or propane, or other such hydrocarbon which can produce the oxygen-containing hydrocarbon in the presence of oxygen.

The aforesaid reaction is governed by factors including the temperature, concentration of the oxygen-containing hydrocarbon, and oxygen concentration, as will be specifically indicated in experimental examples to be given later.

Other objects and advantages of the invention will become apparent from the following description when taken in conjunction with the accompanying drawing, wherein.

Figure 1:
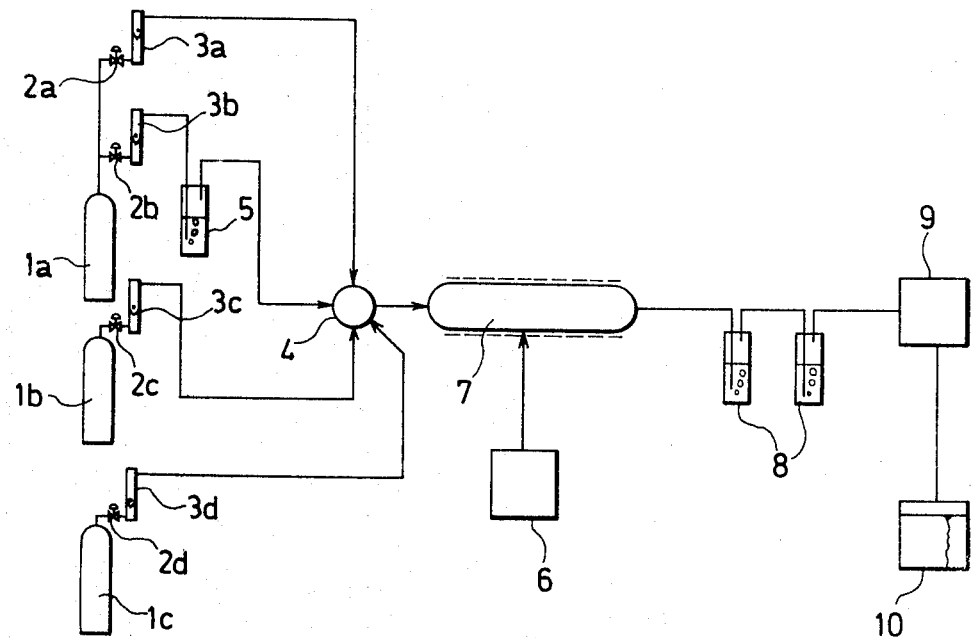
FIG. 1 is a flow sheet of an experimental arrangement for the oxidation reaction in accordance with the invention.

First, with reference to the flow sheet of FIG. 1, experiments conducted on the oxidation reaction of the invention will be described in detail below. As shown, the experimental arrangement includes cylinders $1a$, $1b$, $1c$ containing, respectively, carrier nitrogen gas, NO gas, and oxygen gas. These gas cylinders are connected, through flow control valves $2a$, $2b$, $2c$, $2d$ and flowmeters $3a$, $3b$, $3c$, $3d$, to a mixer 4.

On the downstream side of the flowmeter $3b$ is installed a bubble tower 5 in which an oxygen-containing hydrocarbon is stored. As nitrogen gas from the cylinder $1a$ is admitted to the bubble tower 5, the latter can accordingly deliver the oxygen-containing hydrocarbon, at a concentration corresponding to the temperature and vapor pressure in the tower, to the mixer 4.

The gas mixture leaves the mixer 4 into a reactor 7, which is set to a temperature between room temperature and 1500° C.±5° C. by a PID temperature controller 6 to carry out an oxidation reaction. Gas-absorbing bottles 8 installed downstream from the reactor 7 contain an aqueous solution of sodium sulfite which can absorb $NO_2$ from the gases leaving the reactor 7. A chemiluminescence analyzer 9 determines the NO content of the gases from the bottles 8 and outputs the results into a recorder 10.

The experiments were performed by adjusting the flow control valves $2a-2b$ and the flowmeters $3a-3d$ so that the mixed gas composition at the inlet of the reactor 7 was 150 ppm NO, 1-4% $O_2$, 75-1500 ppm oxygen-containing hydrocarbon, and the balance 96-99% $N_2$. The gas flow rate was set to 2 Nl/min. and the retention time to 1.5-5 sec. The temperature in the reactor 7 was set between 100° and 700° C. by the PID temperature controller 6.

In all runs the NO and $NO_2$ contents of the treated gases were determined by the chemiluminescence analyzer while maintaining the material balance with cross checking of two measurements, i.e., (1) measurement of the unreacted NO amount after the complete absorption of $NO_2$ by the aqueous solution of sodium sulfite in the gas-absorbing bottles 8, and (2) measurement of the $NO_2$ amount by an electron-spin resonance meter.

Figure 2:
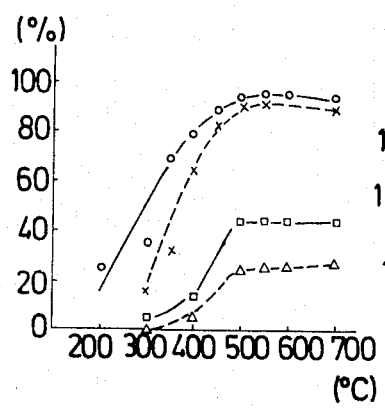
FIG. 2 is a graph summarizing the results of experiments conducted with the arrangement of FIG. 1.

The experimental results are graphically represented in FIG. 2.

In the graph, the rate (%) of oxidation of NO to $NO_2$ is plotted as ordinate and the temperature (°C.) as abscissa. The "X" curve represents formaldehyde (HCHO/NO ≑ 1.25, $O_2$=1%), the "O" curve represents methanol ($CH_3OH/NO$ ≑ 1.0, $O_2$=1%), the "□" curve represents formaldehyde (NCHO/NO ≑ 1.25, $O_2$=0.1%), and the "Δ" curve represents methanol ($CH_3OH/NO$ ≑ 1.0, $O_2$ ≑ 0.1%). For the purposes of the invention, the rate of oxidation of NO to $NO_2$ is defined as NO ⟶ $NO_2$ oxidation rate (%) =

$$\frac{\text{Inlet NO conc. (ppm)} - \text{outlet NO conc. (ppm)}}{\text{Inlet NO conc. (ppm)}} \times 100$$

It will be appreciated from FIG. 2 that the reaction in accordance with the present invention starts at 200° C. at an $O_2$ concentration of 1% or more, and with the addition of an oxygen-containing hydrocarbon, and that the reaction proceeds faster as the temperature increases.

Next, an example of the process of the invention for controlling nitrogen oxides in exhaust gases will be described in connection with the flow sheet of FIG. 3.

Figure 3:
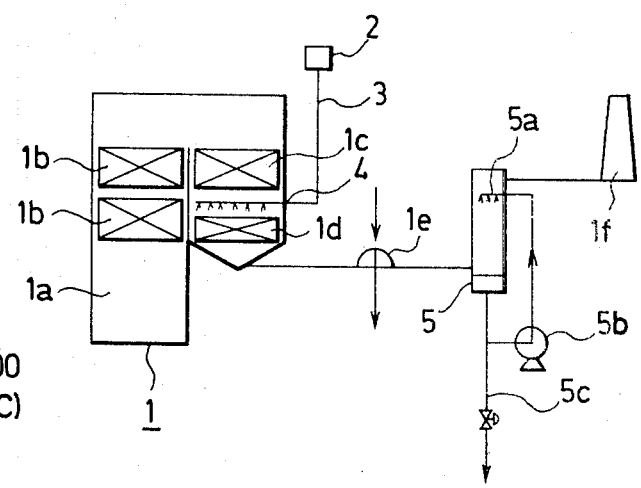
FIG. 3 is a flow sheet of an arrangement for practicing the process of the invention for the removal of NOx from exhaust gases.

In FIG. 3 the numeral 1 designates the body of an LNG-fired boiler incorporating a furnace $1a$. A boiler of this type emits gases usually containing from 100 to 150 ppm of NOx.

The exhaust gas stream that has left the furnace $1a$ passes through various heat exchangers arranged in series, such as superheaters $1b$, reheater $1c$, economizer $1d$, and air heater $1e$. After the heat exchange, the effluent is discharged from the system to the atmosphere through a stack $1f$.

When the process of the invention is to be applied to a boiler, it is ideal to inject methanol gas into the boiler at the inlet of the economizer $1d$ therein by reasons of the temperature conditions, boiler construction, and convenience in handling the oxygen-containing hydrocarbon. The methanol gas is supplied from a methanol storage tank 2 through a methanol line 3 and a bank of nozzles 4, and is thoroughly mixed with the effluent in the economizer $1d$, thanks to the bundle of tubes therein serving as baffles, whereby the NO in the gas mixture is rapidly oxidized to $NO_2$.

An $NO_2$ absorption column 5 uses an absorbing solution of sodium sulfite, for example, and injects the liquid in the form of droplets through spray nozzles $5a$ for gas-liquid contact and absorption of $NO_2$ from the exhaust gases. The column is equipped with a circulating pump $5b$ and a blow line $5c$. Since the absorbed $NO_2$ in a liquid phase mostly occurs as $NO_2^-$ and $NO_3^-$ ions, the pH of the absorbing solution will gradually decrease. When the pH has dropped to 5 or downwards, the solution is blown down through the blow line $5c$.

The exhaust gases, having been stripped of $NO_2$ in the $NO_2$ absorption column ad thus made harmless, is released from the system to the atmosphere via the stack $1f$.

The concentration of oxygen is not specified herein because almost all the boilers in operation today emit exhaust gases containing 1 to 10% oxygen. If any exhaust gas is exceptionally free from oxygen, then oxygen may be injected in the same manner as methanol into the exhaust gas or, alternatively, the combustion condition may be shifted toward a higher percentage of excess air.

What is claimed is:

1. In a process for the removal of NO from combustion exhaust gases wherein NO is oxidized to $NO_2$ and the NO$_2$ is removed from the resulting gas, the improvement which comprises mixing oxygen and a compound selected from the group of oxygen-containing hydrocarbon and precursors which, on being subject to oxidation, form said oxygen-containing compounds with the exhaust gas and heating the mixture to a temperature sufficient to effect oxidation of the NO therein, wherein the temperature is between 100° to 700° C., the amount of oxygen used is between 1 to 4% and the amount of oxygen-containing hydrocarbon is between 75 to 1500 ppm.

2. The process according to claim 1 wherein said oxygen-containing hydrocarbon is methanol or formaldehyde.

3. The process according to claim 1 wherein said precursor is at least one hydrocarbon selected from the group consisting of methane, ethane, and propane.

* * * * *